J. A. HART.
MACHINE FOR SHAPING RIBS ON PIANO SOUNDING BOARDS.
APPLICATION FILED NOV. 20, 1914.
1,189,253.
Patented July 4, 1916.
3 SHEETS—SHEET 1.
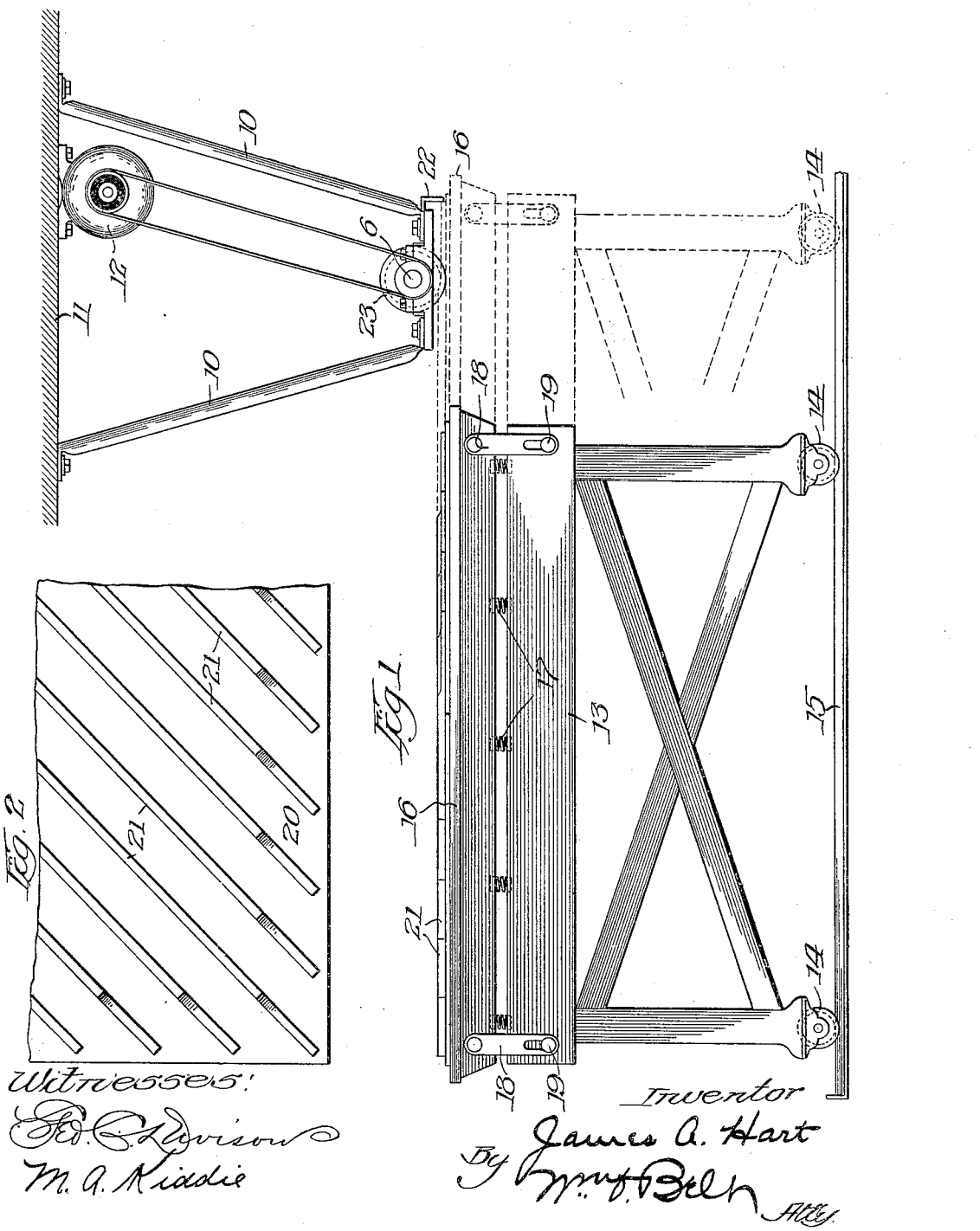

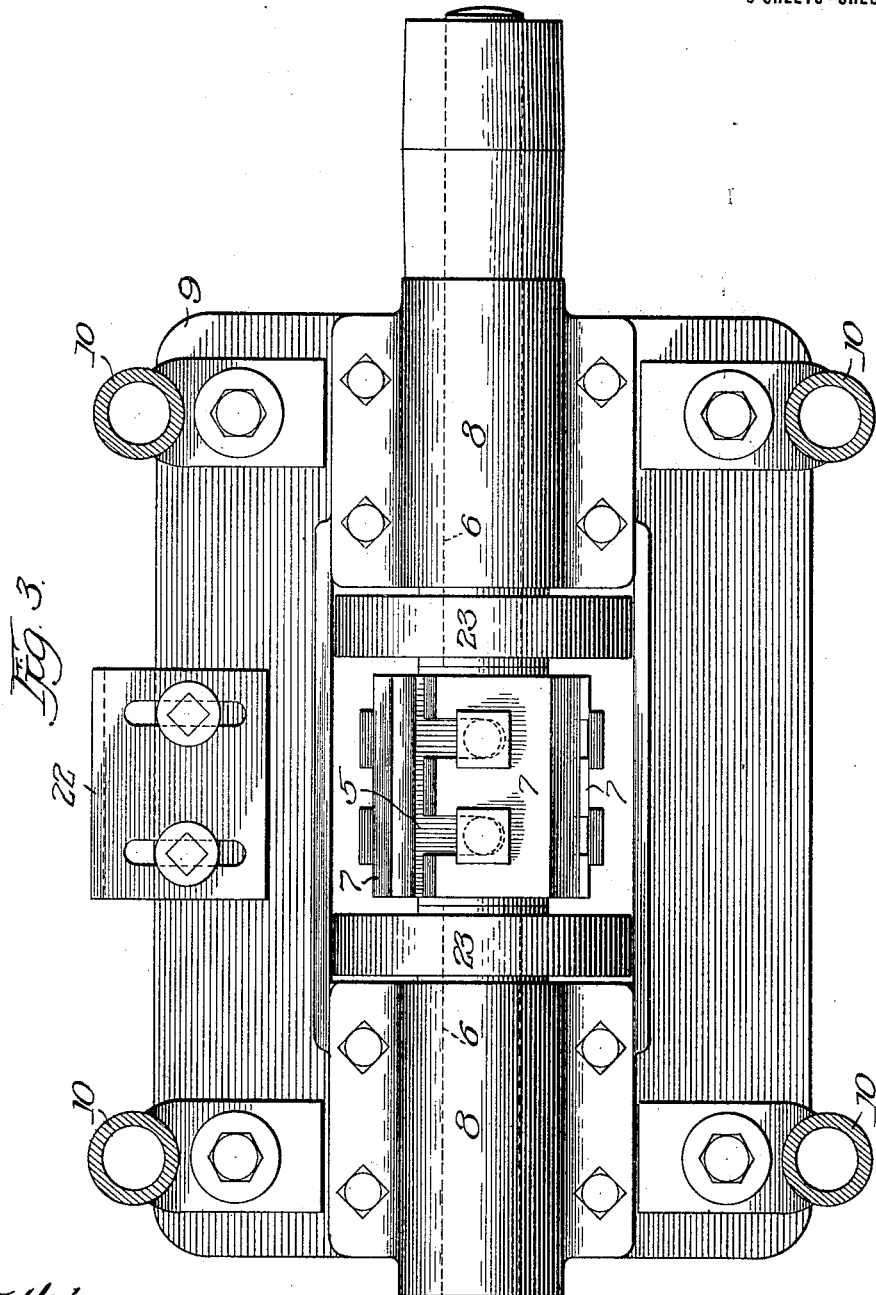

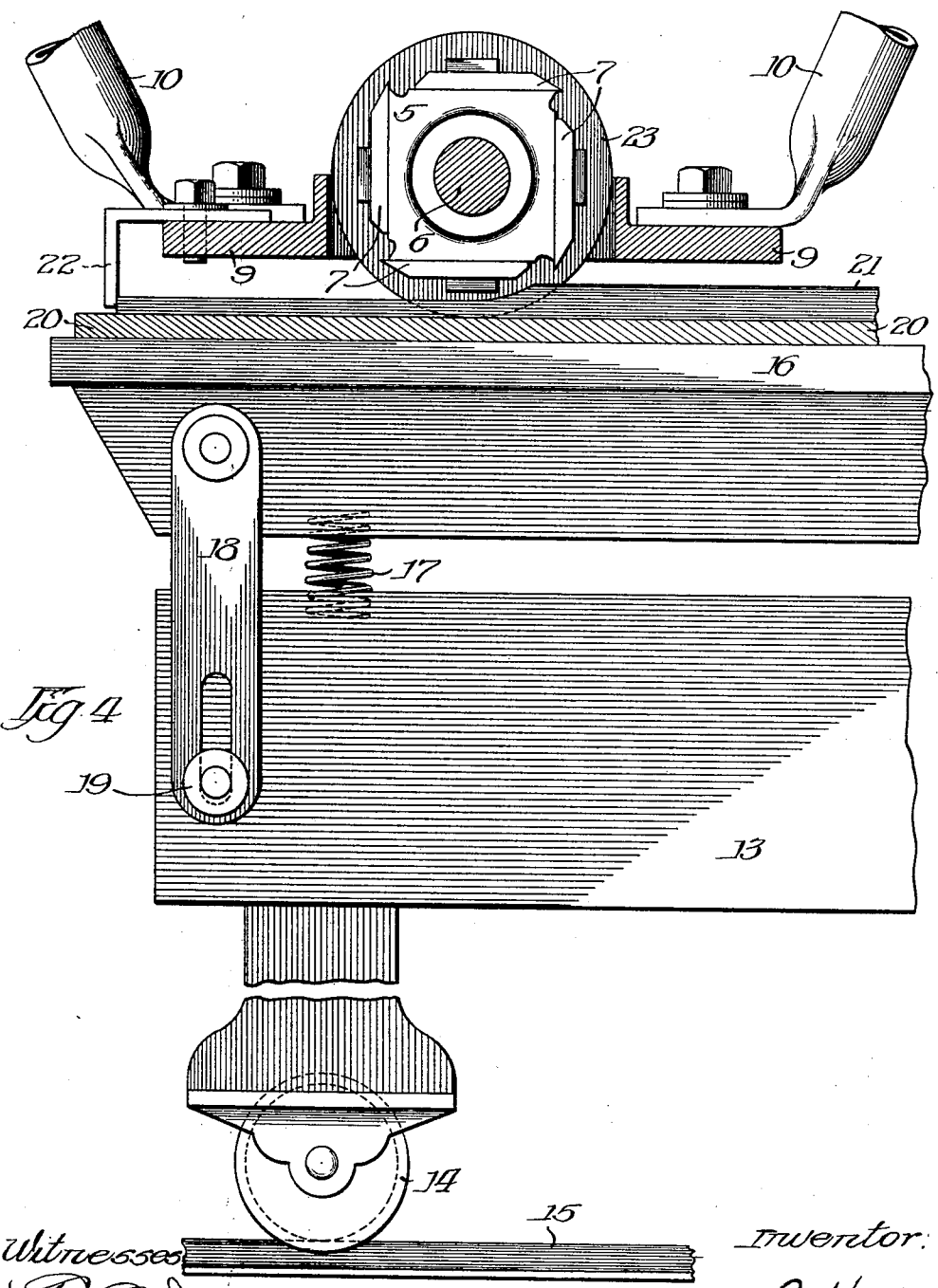

UNITED STATES PATENT OFFICE.

JAMES A. HART, OF LAPORTE, INDIANA, ASSIGNOR TO THE HOBART M. CABLE COMPANY, OF LAPORTE, INDIANA, A CORPORATION OF ILLINOIS.

MACHINE FOR SHAPING RIBS ON PIANO SOUNDING-BOARDS.

1,189,253.

Specification of Letters Patent.

Patented July 4, 1916.

Application filed November 20, 1914. Serial No. 873,126.

*To all whom it may concern:*

Be it known that I, JAMES A. HART, a citizen of the United States, residing at Laporte, in the county of Laporte and State of Indiana, have invented certain new and useful Improvements in Machines for Shaping Ribs on Piano Sounding-Boards, of which the following is a specification.

The object of this invention is to provide a machine of simple and inexpensive construction, which can be easily operated for rapidly and uniformly shaping the ribs on piano sounding boards.

A further object of the invention is to provide a machine of this character with guiding and adjusting devices of simple construction which will insure the uniform shaping of the ribs of piano sounding boards regardless of any inequalities that may exist in the sounding board or the ribs where the ribs are shaped.

In the accompanying drawings illustrating the invention Figure 1 is an elevation illustrating the invention as used in actual operation; Fig. 2 illustrates a section of a sounding board showing the ribs properly shaped; Fig. 3 is an enlarged top plan view of the cutter mechanism showing the supporting arms in section; Fig. 4 is an enlarged elevation of the table showing the sounding board and cutting mechanism in section.

Referring to the drawings, 5 is a cutter head of any suitable construction mounted upon a horizontal shaft 6 and carrying a plurality of cutting blades 7 adapted to be adjusted on the head in an approved manner. This shaft is mounted in bearings 8 on a supporting plate 9 which is suspended by suitable arms 10 from the ceiling 11. The shaft is driven in any suitable manner as by belt connection with a motor 12 secured to the ceiling.

The work is supported on a movable table comprising a frame 13 mounted on rollers 14 to travel on guide rails 15 to carry the work to and from the cutter head. This table is provided with a bed or top member 16 which is yieldingly supported by a plurality of springs 17 and is held in place on the frame by links 18 having pin and slot connection at 19 with the frame.

In practice the sounding board 20 is arranged on the table so that one of the ribs 21 thereon will be presented endwise to the cutter and the table is pushed along until the cutter has cut down the rib, as shown in Fig. 2, the length of cut being regulated by a stop 22 which is adjustably mounted on the supporting plate 9 and arranged in the path of movement of the sounding board. The depth of cut is regulated by a pair of rollers 23 mounted on the shaft 6 at opposite ends of the cutter head and arranged to engage the sounding board on opposite sides of the rib being shaped. These rollers regulate the depth of cut which may be varied as desired by adjusting the cutting blades on the cutter head. When once adjusted the blades will cut the ribs uniformly regardless of any variations in the height of the ribs above the sounding board or in the thickness of the sounding board, and the yielding bed on which the sounding board rests provides for variations in the thickness of the sounding board.

It will readily be observed that my machine is very simple in construction and easy to operate and that it provides for the uniform shaping of the ribs on a sounding board. This is of great importance because it is highly desirable to have the scarfed ends of the ribs of uniform size to provide for the desired tone and it is for this reason that the rollers regulate the cut so that, regardless of the height of the rib, the scarfed ends will always be of uniform height above the board.

I claim:

1. In a machine for shaping the ribs on piano sounding boards, the combination of a stationary revolving cutter, a table for carrying the work to the cutter comprising a bodily movable frame having a bed yieldingly mounted thereon to receive the work, and means associated with the cutter and adapted to engage the sounding board on opposite sides of a rib for regulating the cut to insure uniform shaping of the ribs.

2. In a machine for shaping the ribs on piano sounding boards, the combination of a stationary revolving cutter, a table for carrying the work to the cutter comprising a bodily movable frame and a bed yieldingly supported thereon to receive the work, and rollers mounted concentrically with the axis of the cutter to engage the sounding board on opposite sides of a rib to insure uniform shaping of the ribs.

3. In a machine for shaping the ribs on piano sounding boards, the combination of a suspended supporting plate, a shaft journaled in bearings on said plate, a cutter mounted on said shaft, a movable table for carrying the work to the cutter, said table having a yielding bed to receive the work, rollers on the shaft adjacent said cutter to engage the board on opposite sides of the rib being operated upon by the cutter, and means for operating said shaft.

4. In a machine for shaping the ribs on piano sounding boards, the combination of a fixed supporting plate, a revolving cutter mounted on the plate, a movable table for carrying the work to the cutter, said table having a yielding bed to receive the work, means associated with the cutter for regulating the cut to insure uniform shaping of the ribs, and a stop on the supporting plate for limiting the length of cut.

5. In a machine for shaping the ribs on piano sounding boards, the combination of a suspended supporting plate, a shaft journaled in bearings on said plate, a cutter mounted on said shaft, a movable table for carrying the work to the cutter, said table comprising a frame and a relatively movable bed to receive the work, springs supporting the bed to enable it to yield as required, links connecting the bed to the frame, rollers mounted on the shaft concentrically with the axis of the cutter to engage the board on opposite sides of the rib being operated upon by the cutter, a stop on the plate for limiting the length of cut, and means for operating said shaft.

JAMES A. HART.

Witnesses:
H. V. McLaughlin,
Edwin W. Schurz.

Copies of this patent may be obtained for five cents each, by addressing the "Commissioner of Patents, Washington, D. C."